United States Patent [19]

Labana et al.

[11] 3,888,943

[45]*June 10, 1975

[54] POWDER COATING COMPOSITIONS COMPRISING A BLEND OF COREACTIVE POLYMERS - I

[75] Inventors: Santokh S. Labana, Dearborn Heights; Ares N. Theodore, Farmington, both of Mich.

[73] Assignee: Ford Motor Company, Dearborn, Mich.

[ * ] Notice: The portion of the term of this patent subsequent to Dec. 25, 1990, has been disclaimed.

[22] Filed: Dec. 19, 1973

[21] Appl. No.: 426,168

[52] U.S. Cl......... 260/836; 117/124 E; 117/132 BE; 260/17.4 R; 260/30.6 R; 260/31.8 E; 260/42.28; 260/78.5 R; 260/78.5 T; 260/824 EP; 260/830 R; 260/830 TW; 260/DIG. 16; 260/DIG. 17; 260/DIG. 19
[51] Int. Cl.² ........................................ C08G 45/04
[58] Field of Search ................................... 260/836

[56] References Cited
UNITED STATES PATENTS

| | | | |
|---|---|---|---|
| 3,070,564 | 12/1962 | Roeser | 260/836 |
| 3,222,419 | 12/1965 | Jubilee | 260/836 |
| 3,514,419 | 5/1970 | Darlow | 260/836 |
| 3,595,944 | 7/1971 | Manning | 260/836 |
| 3,781,379 | 12/1973 | Theodore | 260/836 |
| 3,808,114 | 4/1974 | Tsuchihara | 260/836 |

*Primary Examiner*—Paul Lieberman
*Attorney, Agent, or Firm*—Olin B. Johnson; Keith L. Zerschling

[57] ABSTRACT

Powder coating compositions are dissolved which comprise a blend of qualitatively-monofunctional, quantitatively-polyfunctional, coreactive copolymers. One polymer of the blend is an epoxy-functional copolymer of about 5 to about 20 weight percent of a glycidyl ester of a monoethylenically unsaturated acid and about 80 to about 95 weight percent of monoethylenically unsaturated, quantitatively and qualitatively-monofunctional monomers. The second polymer of the blend is a copolymer of about 5 to about 20 weight percent of an anhydride of an olefinically-unsaturated dicarboxylic acid and about 80 to 95 weight percent of monoethylenically unsaturated, quantitatively and qualitatively-monofunctional monomers. The epoxy-functional copolymer and the anhydride-functional copolymer are blended in such proportions as to provide about 0.4 to about 1 anhydride group per epoxy group.

8 Claims, No Drawings

POWDER COATING COMPOSITIONS COMPRISING A BLEND OF COREACTIVE POLYMERS - I

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) an epoxy-functional copolymer of a glycidyl acrylate and other olefinically unsaturated monomers and (2) an anhydride crosslinking agent have been described heretofore in our co-pending U.S. patent application Ser. No. 172,224, filed Aug. 16, 1971; in U.S. Pat. No. 3,758,632; in U.S. patent application Ser. No. 394,887, filed Sept. 6, 1973, by A. N. Theodore, a coinventor herein, E. C. Siwiec and H. Van oene; in U.S. patent application Ser. No. 394,876 filed Sept. 6, 1973, by A. N. Theodore, a coinventor herein, E. C. Siwiec and H. Van Oene; in U.S. patent application Ser. No. 394,878 filed Sept. 6, 1973 by A. N. Theodore, a coinventor herein, E. C. Siwiec and H. Van Oene; in our U.S. patent application Ser. No. 394,879, filed Sept. 6, 1973; in U.S. patent application Ser. No. 394,880 filed Sept. 6, 1973 by S. S. Labana, a coinventor herein, and S. C. Peng and in our U.S. patent application Ser. No. 394,881 filed Sept. 6, 1973.

Both monomeric anhydrides and polyanhydrides, e.g., poly (azelaic anhydride), poly (adipic anhydride), and poly (sebasic anhydride), make effective crosslinking agents for suitable copolymers such as an epoxy-functional copolymer. Care must be exercised in the preparation and use of such coating compositions in that monomeric anhydrides tend to sublime during processing and it has been found that powders containing polyanhydrides of the type above listed have a tendency to cake.

THE INVENTION

The problems with monomeric anhydrides and polyanhydrides are overcome by replacing these materials with a copolymer of an anhydride of an olefinically unsaturated dicarboxylic acid and monoethylenically unsaturated dicarboxylic acid and monoethylenically unsaturated dicarboxylic acid and monoethylenically unsaturated, quantitatively and qualitatively-monofunctional monomers. Powder paint compositions comprising a homogeneous blend of epoxy-functional copolymers and such anhydride-functional copolymers demonstrate excellent resistance to caking and phase separation. More specifically, such compositions comprise a homogeneous blend of (1) an epoxy-functional copolymer of about 5 to about 20 weight percent of a glycidyl ester of a monoethylenically unsaturated carboxylic acid, e.g., glycidyl methacrylate, and about 80 to about 95 weight percent of monoethylenically unsaturated, quantitatively and qualitatively-monofunctional monomers and (2) an anhydride-functional copolymer of about 5 to about 20 weight percent of an anhydride of an olefinically unsaturated dicarboxylic acid and about 80 to about 95 weight percent of monoethylenically unsaturated, qualitatively and quantitatively-monofunctional monomers. Both the epoxy-functional copolymer and the anhydride-functional copolymer used in these compositions are therefore qualitatively-monofunctional and quantitatively polyfunctional in that they each have a single type of operative functional group, i.e., epoxy and anhydride respectively, and an average of more than one of such groups per molecule. A monoethylenically unsaturated monomer that is both quantitatively and qualitatively monofunctional has as its sole operative functionality its one olefinic unsaturation group, e.g., styrene, methyl methacrylate, etc.

The epoxy-functional copolymer and the anhydride-functional copolymer are blended together in such quantities to provide between about 0.4 and about 1 anhydride group per epoxy group. Blending may be effected by melt blending and extrusion as well as by vacuum drying techniques.

The coatings obtained by baking these powders at 170°C. for 15–30 minutes exhibit good solvent resistance and good appearance.

Except in those instances herein wherein a specific compound is named, the term "acrylate" is used to include esters of both acrylic and methacrylic acid, i.e., acrylates and methacrylates.

The term "alpha-beta" unsaturation as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene.

DETAILED DESCRIPTION OF THE INVENTION

Epoxy-functional copolymers suitable for use in the powder coating materials of this invention are readily formed by conventional free radical induced polymerization of suitable alpha-beta olefinically unsaturated monomers. These copolymers having pendant epoxide groups contain between about 5 and about 20, preferably between 8 and 15, weight percent of a glycidyl ester of a monoethylenically unsaturated carboxylic acid, e.g., glycidyl acrylate and glycidyl methacrylate. These monomers provide the polymer with its sole functionality. The remainder of the epoxy-functional copolymer, i.e., about 80 to about 95 weight percent thereof, consists essentially of monofunctional, olefinically unsaturated monomers, preferably alpha-beta olefinically unsaturated monomers. These can be acrylates or a mixture of acrylates and monovinyl hydrocarbons. Preferably, in excess of 50 weight percent of the copolymer monomers are esters of a $C_1$–$C_8$ monohydric alcohol and acrylic or methacrylic acid, i.e., methyl methacrylate, ethyl acrylate, butyl acrylate, hexyl acrylate, and 2-ethylhexyl methacrylate. $C_8$–$C_9$ monovinyl hydrocarbons such as styrene, alpha methyl styrene, vinyl toluene, t-butyl styrene and chlorostyrene are suitable for use but preferably comprise less than 50 weight percent of the copolymer.

The epoxy-functional copolymers used in the coating compositions of this invention have a glass transition temperature in the range of 40° to 90°C., preferably between 50° and 80°C., and a molecular weight ($\overline{M}_n$) in the range of about 1500 to about 15,000, preferably about 2500 to about 6000.

In preparing this copolymer, the epoxy-functional monomer, e.g., glycidyl methacrylate, is mixed with the aforementioned ethylenically unsaturated remainder monomers and reacted by conventional free radical initiated polymerization in such proportions as to obtain the copolymer for the powder coating compositions. Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, di-(2-ethylhexyl) peroxydicarbonate, diisopropyl peroxydicarbonate, t-butyl peroxypivalate, decanoyl peroxide, azobis (2-methylpropionitrile), etc. The polymerization is preferably carried out in solution using a solvent in which the epoxy-functional copolymer is soluble. Toluene, xylene, dioxane, butanone, etc., are suitable solvents for this polymerization. If the epoxy-functional copolymer is prepared in solution, the solid copolymer can be precipitated by pouring the solution at a slow rate into a non-solvent for such copolymer such as hexane, octane or water under suitable agitation conditions. The copolymer thus obtained is further dried so that it contains less than about three percent of the materials that volatilize at the temperatures used for baking the coatings.

These copolymers can also be prepared by emulsion polyperization, suspension polymerization, bulk polymerization or their suitable combinations. In these methods of preparing the copolymers, chain transfer agents may be required to control the molecular weight of the copolymer to a desired range. The solid copolymers obtained by these methods must also be dried to contain less than about 3 percent of the materials that volatilize at the temperatures used for baking the coatings.

For powder coating applications, both molecular weight and molecular weight distribution of the epoxyfunctional copolymer are important. While the molecular weight ($\overline{M}_n$) range extends from about 1500 to about 15,000, the copolymer component must not contain significant amounts of higher molecular weight fractions. No more than five (5) percent of the copolymer should be of molecular weight greater than 20,000. The molecular weight distribution as measured by the ratio of weight average to number average molecular weight ($M_w/M_n$) should be in the range of 1.6 to 3.0. The preferred range of molecular weight distribution is in the range of 1.7 to 2.2.

The anhydride-functional copolymer used herein in combination with the epoxy-functional copolymer is prepared in essentially the same manner as the epoxyfunctional copolymer with the few modifications hereinafter described or illustrated in the examples. In preparing these copolymers it is advantageous to dissolve the monomeric anhydride in acetone or other suitable solvent prior to admixture with the other monomers and to carry out the polymerization at a temperature in the range of about 80° to about 100°C.

The anhydride-functional copolymer is prepared from about 5 to about 20, preferably between about 8 and about 15, weight percent of an olefinically unsaturated, monomeric anhydride of a dicarboxylic acid and about 80 to about 95, preferably between about 85 to about 92, weight percent of monofunctional, olefinically unsaturated monomers. The anhydride monomer is selected from anhydrides that will combine with olefinically unsaturated monomers in a free radical induced polymerization. Among these are maleic anhydride, itoconic anhydride, dodecenyl succinic anhydride, dichloromaleic anhydride, tetrahydrophthalic anhydride, etc. With these examples as guidelines other suitable anhydrides will be readily apparent to those skilled in the art. As in the epoxy-functional copolymer, the other olefinically unsaturated monomers are preferably alpha-beta olefinically unsaturated monomers. These can be acrylates or a mixture of acrylates and monovinyl hydrocarbons. Preferably, in excess of 50 weight percent of the copolymer monomers are esters of a $C_1$–$C_8$ monohydric alcohol and acrylic or methacrylic acid, i.e., methyl methacrylate, ethyl acrylate, butyl acrylate, hexyl acrylate, and 2-ethylhexyl methacrylate. $C_8$–$C_{12}$ monovinyl hydrocarbons such as styrene, alpha methyl styrene, vinyl toluene, t-butyl styrene, and chlorostyrene are suitable for use but preferably comprise less than 50 weight percent of the copolymer. The molecular weights and molecular weight distribution characteristics of the anhydride-functional copolymer should be within the ranges heretofore set forth for the epoxy-functional copolymer.

The epoxy-functional copolymer and the anhydridefunctional copolymer are blended in such proportions as to provide about 0.4 to about 1 anhydride group per epoxy group.

Except for the anhydride constituent monomers in the anhydride-functional copolymer and the glycidyl ester monomers in the epoxy-functional copolymer, the constituent monomers of both copolymers are quantitatively and qualitatively monofunctional with respect to the polymerization reaction in which the respective copolymers are formed. This functionality is used up in the polymerization and hence they provide no reactive functionality with respect to the thermosetting reaction when the two polymers are crosslinked.

These powder coating compositions advantageously contain a flow control agent as a part of the powder coating mixture. The flow control agent is a polymer having a molecular weight ($\overline{M}_n$) of at least 1000 and advantageously comprises between 0.05 and 4.0 weight percent of the mixture. The flow control agent has a glass transition temperature at least 20°C. below the glass transition temperature of each of the copolymers.

One group of suitable flow control agents are acrylic polymers. Preferred acrylic polymers which may be used for flow control agents are polylauryl acrylate, polybutyl acrylate, poly (2-ethylhexyl acrylate), polylauryl methacrylate and polyisodecyl methacrylate. These advantageously have molecular weights in the range of about 3000 to about 20,000, preferably about 4000 to about 15,000.

The flow control agent may also be a fluorinated polymer having a surface tension, at the baking temperature of the powder, lower than that of the copolymers used in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000 (advantageously 1000 to 20,000) may also be used, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200°C. and the catalyst should produce a gel time for the powder coating composition at the baking temperature to be used which is at least 1 minute but no greater than 20 minutes. This gel time is preferably between about 2 and about 9 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxyethyl) methyl ammonium bromide. Suitable catalysts of the imidazole type include: 2-methyl-4-ethyl imidazole, 2-methyl imidazole, imidazole, 2-[(N-benzylanilino)methyl] - 2-imidazoline phosphate, and 2-benzyl - 2-imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The catalyst used in an individual powder coating composition is generally solid at room temperature and has a melting point of from 50° to 200°C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkylpoly (ethyleneoxy) phosphate or alkyllauryl poly (ethyleneoxy) phosphate; polyethyleneimine, poly (2-vinyl pyrrolidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Having described the various materials which are employed in formulating the powder coating compositions of this invention, a plurality of examples are hereinafter set forth to illustrate various individual powder coating compositions.

EXAMPLE 1

An anhydride-functional copolymer is prepared from the below listed components in the manner hereinafter described:

| Reactants | Amount, grms. | Percent By Weight Of Total Reactants |
|---|---|---|
| maleic anhydride | 24.0 | 10 |
| butyl methacrylate | 100.0 | 50 |
| styrene | 16.0 | 5 |
| methyl methacrylate | 60.0 | 5 |

The above listed monomers are admixed and 2,2' -Azobis - (2-methylpropionitrile), hereinafter called AIBN, in the amount of 12.0 grams (6% based on combined mixture. The solution is added dropwise over a 2 hour period into 200 ml. toluene at 80°–100°C. under a nitrogen atmosphere. Then 0.2 grams of AIBN dissolved in 15 ml. acetone are added over ½ hour period and refluxing is continued for 3 additional hours.

The polymer solution is diluted with 200 ml. acetone and coagulated in 2 liters of hexane. The white powder is dried in a vacuum oven for 24.0 hours at 55°C. The molecular weight of the anhydride copolymer is $M_w/M_n$=5450/3180 and its Tg is 59°C.

An epoxy-functional copolymer is prepared from the below listed components in the manner hereinafter described:

| Reactants | Amount, grms. | Percent By Weight Of Total Reactants |
|---|---|---|
| glycidyl methacrylate | 30.0 | 15 |
| butyl methacrylate | 90.0 | 45 |
| styrene | 10.0 | 5 |
| methyl methacrylate | 70.0 | 35 |

The above listed monomers are admixed and 2,2' - Azobis -(2-methylpropionitrile), hereinafter called AIBN, in the amount of 12.0 grams (6% based on combined weights of reactants) are added to the monomer mixture. The polymerization and isolation of the polymer is carried out as in the preparation of the anhydride-functional copolymer of this example. The molecular weight of this copolymer is determined to be $M_w/M_n$ = 5490/3060 and its Tg is 58°C.

A powder coating composition is prepared by combining 25.0 grams of anhydride-functional copolymer and 25.0 grams of the epoxy-functional copolymer with the following ingredients:

| | |
|---|---|
| poly (2-ethylhexyl acrylate)$M_n$=9,000 | 0.45 grams |
| titanium dioxide | 5.50 grams |
| Ferrite Yellow | 4.00 grams |

All of the above listed components are ball-milled for 5 hours and mill-rolled for 5 minutes at 125°C. This material is allowed to cool to room temperature, i.e., 20°–25°C. It is then granulated and converted to a particle size of 5–30 microns with a fluid energy mill. The powder demonstrates non-caking characteristics and a gel time of 3.0 minutes.

This powder composition is sprayed electrostatically on grounded steel panels by using a conventional electrostatic powder spray gun operating at 50 KV charging voltage. The coatings on the panels are cured at 180°C. for 30 minutes. The cured coatings have good appearance and hardness. This powder composition is next applied to other substrates including brass, zinc, aluminum, copper, bronze and glass and the cured coatings obtained demonstrate good adhesion. These coatings are tested for solvent resistance and are found to be insoluble in xylene, methyl ethyl ketone and gasoline.

EXAMPLE 2

A powder paint composition is prepared by mixing 25.0 grams of the anhydride-functional copolymer of Example 1 and 25.0 grams of the epoxy-functional copolymer of Example 1 with the following other ingredients:

|  | Grams |
| --- | --- |
| diepoxide (Epichlorohydrin Bisphenol A type with average mol. weight of 900 and a WPE of 500) | 3.00 |
| Titanium dioxide | 5.50 |
| Ferrite yellow | 4.50 |
| Poly (2-ethylhexylacrylate) | 0.45 |

The term "WPE" as used herein means average weight per epoxide group.

All components above listed are ball milled for 4 hours and mill rolled for 5 minutes at 130°C. The material is granulated and pulverized to desired particle size (15–30 microns). The powder leveled well and was non-caking.

This powder composition was electrostatically sprayed on steel panels and crosslinked by baking both in accordance with the conditions used in Example 1. These coatings demonstrate good appearance, solvent resistance to xylene, methyl ethyl ketone and gasoline and good impact strength.

EXAMPLE 3

A powder paint composition is prepared using epoxy-functional copolymer of Example 1 and an anhydride-functional copolymer of Example 1 and an anhydride-functional copolymer prepared from the below listed monomers using the procedure used to prepare the anhydride-functional copolymer of Example 1.

| Reactants | Amounts, grams | Percent by Weight Of Total Reactants |
| --- | --- | --- |
| maleic anhydride | 16.0 | 8 |
| butyl methacrylate | 104.0 | 52 |
| styrene | 10.0 | 5 |
| methyl methacrylate | 70.0 | 30 |

The amount of initiator, AIBN, used is the same as in Example 1.

The epoxy-functional copolymer in the amount of 25.0 grams and the anhydride-functional copolymer in the amount of 25.0 grams are combined with the following other ingredients:

|  | Grams |
| --- | --- |
| diepoxide (Epichlorohydrin-Bisphenol A type — average mol. wt. 900, WPE = 500) | 2.0 |
| Titanium dioxide | 5.0 |
| Ferrite Yellow | 4.5 |
| Poly (2-ethylhexyl acrylate) | 0.47 |

All components are combined with 200.0 grams of acetone - methylene chloride mixture (1.1 by weight) and ball-milled overnight. The solvent mixture is stripped off in a vacuum oven at room temperature. The powder is dried well and converted to the desired particle size (15–30 microns). The powder levels well and is non-caking.

The powder is electrostatically deposited on steel panels as in Example 1 and crosslinked by baking at 180°C. for 25 minutes. The coatings demonstrate good appearance, good adhesion and good solvent resistance as in the previous examples.

EXAMPLE 4

A powder paint composition is prepared using the epoxy-functional copolymer of Example 1 and an anhydride-functional copolymer prepared using the methods and conditions used to prepare the anhydride-functional copolymer of Example 1 and the following ingredients:

| Reactants | Amounts, grams | Percent By Weight Of Total Reactants |
| --- | --- | --- |
| itaconic anhydride | 20.0 | 10.0 |
| butyl methacrylate | 100.0 | 50.0 |
| styrene | 10.0 | 5.0 |
| methyl methacrylate | 70.0 | 35.0 |

The amount of initiator, AIBN, is the same as that employed in preparing the anhydride-functional copolymer of Example 1.

A powder paint composition is next prepared by combining 25.0 grams of the epoxy-functional copolymer of Example 1, 25.0 grams of the anhydride-functional copolymer prepared as described above in this example, with the following ingredients:

|  | Grams |
| --- | --- |
| titanium dioxide | 5.00 |
| Ferrite Yellow | 4.50 |
| poly (2-ethylhexyl acrylate) | 0.45 |
| tetrabutyl ammonium bromide | 0.05 |

All of the above mentioned components are ball-milled for 4 hours and then mill-rolled for 5 minutes at 125°C. The material is allowed to cool and is then granulated and pulverized to particles of sizes between 15 and 30 microns. The powder demonstrates good leveling properties and non-caking characteristics.

This powder is electrostatically sprayed on steel panels and crosslinked thereon by baking following the procedures of Example 1. The resultant coatings demonstrate good appearance, good adhesion to the metal panels and good organic solvent resistance as in the previous examples.

EXAMPLE 5

The procedure of Example 1 is repeated except for the difference that the concentration of glycidyl methacrylate in the epoxy-functional copolymer, the concentration of maleic anhydride in the anhydride-functional copolymer, and the relative proportions of the epoxy-functional copolymer and the anhydride-functional copolymer are adjusted to provide a powder paint composition in which there is present 0.42 anhydride groups per epoxy group. The resultant powder is found to demonstrate good non-caking characteristics. This powder is electrostatically sprayed upon steel panels and thermoset by baking as in Example 1. The resultant cured films demonstrate good appearance, good adhesion, and good impact resistance.

EXAMPLE 6

The procedure of Example 1 is repeated except for the difference that the concentration of glycidyl methacrylate in the epoxy-functional copolymer, the concentration of maleic anhydride in the anhydride-functional copolymer, and the relative proportions of the epoxy-functional copolymer and the anhydride-functional copolymer are adjusted to provide a powder paint composition in which there is present 0.98 anhydride groups per epoxy group. The resultant powder is found to demonstrate good non-caking characteristics. This powder is electrostatically sprayed upon steel panels and thermoset by baking as in Example 1. The resultant cured films demonstrate good appearance, good adhesion, and good impact resistance.

EXAMPLE 7

The procedure of Example 1 is repeated except for the difference that a chemically equivalent amount of dodecenyl succinic anhydride is substituted for the maleic anhydride in the anhydride-functional copolymer. The resultant powder is found to demonstrate good non-caking characteristics. This powder is electrostatically sprayed upon steel panels and thermoset by baking as in Example 1. The resultant cured films demonstrate good appearance, good adhesion, and good impact resistance.

EXAMPLE 8

The procedure of Example 1 is repeated except for the difference that a chemically equivalent amount of dichloromaleic anhydride is substituted for the maleic anhydride in the anhydride-functional copolymer. The resultant powder is found to demonstrate good non-caking characteristics. This powder is electrostatically sprayed upon steel panels and thermoset by baking as in Example 1. The resultant cured films demonstrate good appearance, good adhesion and good impact resistance.

EXAMPLE 9

The procedure of Example 1 is repeated except for the difference that a chemically equivalent amount of tetrahydrophthalic anhydride is substituted for the maleic anhydride in the anhydride-functional copolymer. The resultant powder is found to demonstrate good non-caking characteristics. This powder is electrostatically sprayed upon steel panels and thermoset by baking as in Example 1. The resultant cured films demonstrate good appearance, good adhesion and good impact resistance.

EXAMPLE 10

The procedure of Example 1 is repeated except for the difference that the composition of the epoxy-functional copolymer is as follows:

| Reactants | Percent By Weight Of Total Reactants |
| --- | --- |
| glycidyl acrylate | 15 |
| butyl methacrylate | 38 |
| butyl acrylate | 9 |
| alpha methyl styrene | 8 |
| methyl methacrylate | 25 |
| ethyl acrylate | 5 |

The resultant powder demonstrates good leveling qualities and non-caking characteristics. This powder is electrostatically sprayed upon steel panels and thermoset thereon by baking following the procedures and conditions of Example 1. The resultant cured paint films demonstrate good appearance, good adhesion, good impact resistance and good organic solvent resistance.

EXAMPLE 11

The procedure of Example 10 is repeated with the single difference that the initiator, AIBN, used in the preparation of each of the copolymers is employed in an amount equal to 7 weight percent of the combined monomeric reactants in each case.

EXAMPLE 12

The procedure of Example 1 is repeated except for the differences (1) that the composition of the epoxy-functional copolymer is as follows:

| Reactants | Percent By Weight Of Total Reactants |
| --- | --- |
| glycidyl methacrylate | 8 |
| butyl methacrylate | 40 |
| styrene | 4 |
| vinyl toluene | 4 |
| hexyl acrylate | 6 |
| 2-ethylhexyl acrylate | 8 |
| methyl methacrylate | 30 |

The amount of initiator, AIBN, employed is 0.7 percent based on the combined weight of the reactants, and (2) that the composition of the anhydride-functional copolymer is as follows:

| Reactants | Percent By Weight Of Total Reactants |
| --- | --- |
| maleic anhydride | 6 |
| butyl methacrylate | 50 |
| t-butyl styrene | 10 |
| methyl methacrylate | 34 |

The amount of initiator, AIBN, employed is 0.7 percent based on the combined weight of reactants.

The resultant powder is found to demonstrate good noncaking characteristics. This powder is electrostatically sprayed upon steel panels and thermoset by baking as in Example 1. The resultant cured films demonstrate good appearance, good adhesion and good impact resistance.

EXAMPLE 13

The procedure of Example 1 is repeated except for the difference that the flow control agent, poly (2-ethylhexyl acrylate) is employed in an amount equal to 0.05 weight percent of the powder mixture. The powder demonstrates good non-caking characteristics. This powder is electrostatically sprayed upon steel panels and thermoset by baking as in Example 1. The resultant cured films demonstrate good appearance, good adhesion and good impact strength.

EXAMPLE 14

The procedure of Example 1 is repeated except for the difference that the flow control agent, poly (2-ethylhexyl acrylate) is employed in an amount equal to 1.0 weight percent of the powder mixture. The powder demonstrates good non-caking characteristics. This powder is electrostatically sprayed upon steel panels and thermoset by baking as in Example 1. The resultant cured films demonstrate good appearance, good adhesion and good impact strength.

EXAMPLE 15

The procedure of Example 1 is repeated except for the difference that the flow control agent, poly (2-ethylhexyl acrylate) is employed in an amount equal to 2.0 weight percent of the powder mixture. The powder demonstrates good non-caking characteristics. This powder is electrostatically sprayed upon steel panels and thermoset by baking as in Example 1. The resultant cured films demonstrate good appearance, good adhesion and good impact strength.

EXAMPLE 16

The procedure of Example 1 is repeated except for the difference that the flow control agent, poly (2-ethylhexyl acrylate) is employed in an amount equal to 4.0 weight percent of the powder mixture. The powder demonstrates good non-caking characteristics. This powder is electrostatically sprayed upon steel panels and thermoset by baking as in Example 1. The resultant cured films demonstrate good appearance, good adhesion and good impact strength.

Many modifications of these examples will be apparent to those skilled in the art in view of this specification. It is intended that all such modifications which fall within the scope of this invention be included within the appended claims.

We claim:

1. A thermosettable powder coating composition which exclusive of pigments and other non-reactive components comprises a coreactive mixture of
   1. epoxy-functional copolymer of about 5 to about 20 weight percent of a glycidyl ester of a monoethylenically unsaturated carboxylic acid and about 80 to about 95 weight percent of monoethylenically unsaturated, quantitatively-monofunctional monomers, and having average molecular weight in the range of about 1500 to about 15,000 with no more than 5 percent thereof having molecular weight above 20,000.
   2. an anhydride-functional copolymer of about 5 to about 20 weight percent of an anhydride of an olefinically-unsaturated dicarboxylic acid and about 80 to about 95 weight percent of monoethylenically unsaturated, quantitatively-monofunctional monomers and having average molecular weight in the range of about 1500 to about 15,000 with no more than 5 percent thereof having molecular weight about 20,000, said anhydride-functional copolymer being present in an amount such as to provide about 0.4 to about 1 anhydride group per epoxy group in the epoxy-functional copolymer, and
   3. a polymeric flow control agent forming at least about 0.5 to about 4.0 weight percent of the mixture.

2. A thermosettable powder coating composition in accordance with claim 1 wherein said epoxy-functional copolymer contains about 8 to about 15 weight percent of said glycidyl ester of a monoethylenically unsaturated carboxylic acid and about 85 to about 92 weight percent of said monoethylenically unsaturated, quantitatively-monofunctional monomers.

3. A thermosettable powder coating composition in accordance with claim 1 wherein said glycidyl ester is glycidyl methacrylate.

4. A thermosettable powder coating composition in accordance with claim 1 wherein said glycidyl ester is glycidyl acrylate.

5. A thermosettable powder coating composition in accordance with claim 1 wherein said anhydride-functional copolymer contains about 8 to about 15 weight percent of said anhydride of an olefinically unsaturated dicarboxylic acid and about 85 to about 92 weight percent of said monoethylenically unsaturated, quantitatively-monofunctional monomers.

6. A thermosettable powder coating composition in accordance with claim 1 wherein said olefinically unsaturated dicarboxylic acid is an alpha-beta olefinically unsaturated dicarboxylic acid.

7. A thermosettable powder coating composition in accordance with claim 1 wherein said anhydride of said olefinically unsaturated dicarboxylic acid is maleic anhydride.

8. A thermosettable powder coating composition in accordance with claim 1 wherein said epoxy-functional copolymer and said anhydride-functional copolymer each have average molecular weight in the range of about 2,500 to about 6,000.

* * * * *